US011525375B2

(12) United States Patent
Tralshawala et al.

(10) Patent No.: US 11,525,375 B2
(45) Date of Patent: Dec. 13, 2022

(54) MODELING AND CONTROL OF GAS CYCLE POWER PLANT OPERATION WITH VARIANT CONTROL PROFILE

(71) Applicant: General Electric Company, Schenectady, NY (US)

(72) Inventors: Nilesh Tralshawala, Rexford, NY (US); David Spencer Ewens, Greer, SC (US); Difei Wang, Marietta, GA (US); Karthik Subramanyan, Johns Creek, GA (US); Anthony Bruce Campbell, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/844,476

(22) Filed: Apr. 9, 2020

(65) Prior Publication Data

US 2021/0317759 A1 Oct. 14, 2021

(51) Int. Cl.
*F01K 13/02* (2006.01)
*H02J 3/00* (2006.01)
(Continued)

(52) U.S. Cl.
CPC ............... *F01K 13/02* (2013.01); *F01K 3/04* (2013.01); *F01K 7/30* (2013.01); *H02J 3/003* (2020.01); *G05B 19/0425* (2013.01)

(58) Field of Classification Search
CPC .. H02J 3/003; G05B 19/0425; F05D 2220/70; F05D 2220/72; F05D 2220/722;
(Continued)

(56) References Cited

U.S. PATENT DOCUMENTS 2,260,193 A 10/1941 Overman
5,628,179 A 5/1997 Tomlinson
(Continued)

FOREIGN PATENT DOCUMENTS

CN 113513411 A 10/2021
CN 113513412 A 10/2021
(Continued)

OTHER PUBLICATIONS

R.W. Smith et al., "Advanced Technology Combined Cycles," GE Power Systems, GER-3936A, (May 2001), 20 pages.
(Continued)

*Primary Examiner* — Mickey H France
(74) *Attorney, Agent, or Firm* — James Pemrick; Charlotte Wilson; Hoffman Warnick LLC

(57) ABSTRACT

Embodiments of the disclosure provide a method for operating a combined cycle power plant (CCPP). The method may include creating a variant control profile for the CCPP for a power plant model of the CCPP. The method may include modifying the variant control profile in response to the variant control profile not reducing the fuel consumption or meeting the quality threshold. The method may also include adjusting the CCPP to use the variant control profile in response to the variant control profile reducing the fuel consumption and meeting the quality threshold. Using the variant control profile adjusts a turbine section inlet temperature schedule or an exhaust temperature schedule for the CCPP.

20 Claims, 9 Drawing Sheets

(51) Int. Cl.
  *F01K 3/04* (2006.01)
  *F01K 7/30* (2006.01)
  *G05B 19/042* (2006.01)

(58) Field of Classification Search
  CPC ........ F01K 23/06; F01K 23/10; F01K 23/101;
         F01K 23/103; F01K 23/105; F01K 23/16;
         F01K 3/04; F01K 7/30; F01K 13/02
  USPC ............. 60/39.182, 645, 652, 657, 660, 698
  See application file for complete search history.

(56) References Cited

U.S. PATENT DOCUMENTS

| | | | |
|---|---|---|---|
| 5,973,096 | A | 10/1999 | Watabe et al. |
| 6,062,581 | A | 5/2000 | Stites |
| 6,397,575 | B2 | 6/2002 | Tomlinson et al. |
| 6,591,225 | B1 | 7/2003 | Adelman et al. |
| 8,065,022 | B2 | 11/2011 | Minto et al. |
| 8,447,564 | B2 | 5/2013 | Gross et al. |
| 8,826,670 | B2 | 9/2014 | Hoffmann et al. |
| 9,002,530 | B2 | 4/2015 | O'Connor et al. |
| 9,163,828 | B2 | 10/2015 | Beveridge |
| 9,194,758 | B2 | 11/2015 | Mazzaro et al. |
| 9,200,591 | B2 | 12/2015 | Du et al. |
| 9,217,565 | B2 | 12/2015 | Beveridge et al. |
| 9,255,494 | B2 | 2/2016 | Yashiki et al. |
| 9,292,012 | B2 | 3/2016 | Sayyarrodsari et al. |
| 9,335,004 | B2 | 5/2016 | Abrol |
| 9,382,848 | B2 | 7/2016 | D'Amato et al. |
| 9,494,086 | B2 | 11/2016 | Pandey et al. |
| 9,500,361 | B2 | 11/2016 | Meerbeck et al. |
| 9,581,980 | B2 | 2/2017 | Badwe et al. |
| 9,587,522 | B2 | 3/2017 | Florey et al. |
| 9,734,479 | B2 | 8/2017 | Schmitt et al. |
| 9,771,834 | B2 | 9/2017 | Cheng et al. |
| 9,771,872 | B2 | 9/2017 | Rao et al. |
| 9,885,256 | B2 | 2/2018 | Govindarajulu et al. |
| 9,903,279 | B2 | 2/2018 | Mittricker et al. |
| 9,915,178 | B2 | 3/2018 | Sun et al. |
| 9,964,002 | B2 | 5/2018 | Tiwari et al. |
| 10,025,301 | B2 | 7/2018 | Lu et al. |
| 2002/0107614 | A1 | 8/2002 | Tanaka |
| 2006/0005526 | A1 | 1/2006 | Tanaka et al. |
| 2008/0178571 | A1 | 7/2008 | So et al. |
| 2010/0305768 | A1 | 12/2010 | Holt et al. |
| 2014/0110092 | A1* | 4/2014 | John ........................ F02C 3/30 165/138 |
| 2014/0260177 | A1 | 9/2014 | Reed |
| 2014/0260284 | A1 | 9/2014 | Kim et al. |
| 2014/0331686 | A1 | 11/2014 | Gulen |
| 2015/0159518 | A1 | 6/2015 | Baramov et al. |
| 2015/0184549 | A1 | 7/2015 | Pamujula et al. |
| 2015/0184550 | A1 | 7/2015 | Wichmann et al. |
| 2015/0185716 | A1* | 7/2015 | Wichmann ............ F01K 23/101 700/287 |
| 2015/0275703 | A1* | 10/2015 | Thompson ................ F02C 6/00 60/773 |
| 2016/0018795 | A1 | 1/2016 | Sayyar-Rodsari et al. |
| 2016/0247074 | A1 | 8/2016 | Takeuchi et al. |
| 2016/0281607 | A1 | 9/2016 | Asati et al. |
| 2017/0176959 | A1 | 6/2017 | Vedam et al. |
| 2017/0192397 | A1 | 7/2017 | Vedam et al. |
| 2017/0241285 | A1 | 8/2017 | Bennauer et al. |
| 2017/0248036 | A1 | 8/2017 | Flavin, II et al. |
| 2017/0248038 | A1 | 8/2017 | Ramadhan et al. |
| 2017/0342901 | A1* | 11/2017 | Scipio ................. F04D 27/0276 |
| 2018/0094549 | A1 | 4/2018 | Zhang et al. |
| 2018/0135536 | A1 | 5/2018 | Waniczek et al. |
| 2018/0136617 | A1 | 5/2018 | Xu et al. |
| 2018/0274391 | A1 | 9/2018 | Mathai et al. |
| 2018/0284706 | A1 | 10/2018 | Anubi et al. |
| 2019/0018380 | A1 | 1/2019 | Tomita et al. |
| 2019/0018384 | A1 | 1/2019 | Tomita et al. |
| 2020/0362754 | A1 | 11/2020 | Beauchesne-Martel et al. |
| 2020/0363056 | A1* | 11/2020 | Varonen ................... F01K 3/24 |
| 2021/0317782 | A1 | 10/2021 | Tralshawala et al. |

FOREIGN PATENT DOCUMENTS

| | | |
|---|---|---|
| EP | 1063402 A2 | 12/2000 |
| EP | 2260193 | 9/2009 |
| EP | 2588925 | 1/2012 |
| EP | 2806114 A1 | 11/2014 |
| EP | 3309403 A1 | 4/2018 |
| EP | 3892829 A1 | 10/2021 |
| EP | 3892830 A1 | 10/2021 |
| JP | 5490023 B2 | 5/2014 |
| JP | 5973096 B1 | 8/2016 |
| JP | 6062581 B1 | 1/2017 |
| JP | 2017125456 A | 1/2019 |
| JP | 2017125776 A | 1/2019 |
| JP | 2021167601 A | 10/2021 |
| JP | 2022044539 A | 3/2022 |
| WO | 2009109446 A1 | 9/2009 |
| WO | 2009156299 A2 | 12/2009 |
| WO | 2012000929 A3 | 1/2012 |
| WO | 2017122468 A1 | 7/2017 |
| WO | 2017122469 A1 | 7/2017 |
| WO | 2018082879 A1 | 5/2018 |

OTHER PUBLICATIONS

EP Search Report for corresponding EP Application No. 21164741 dated Sep. 2, 2021, 6 pages.
EP Search Report for corresponding EP Application No. 21164740 dated Sep. 2, 2021, 5 pages.
"Combined Cycle Power Plant", Wikipedia, 2019, pp. 11.
Non-Final Office Action dated Jul. 25, 2022 for related U.S. Appl. No. 16/844,480, filed Apr. 9, 2020; pp. 40.

* cited by examiner

MODELING AND CONTROL OF GAS CYCLE POWER PLANT OPERATION WITH VARIANT CONTROL PROFILE

BACKGROUND

The disclosure relates generally to the modeling and control of power plants. More specifically, embodiments of the disclosure provide an operational methodology to model and control a power plant by modeling and analysis of variant control profiles for the power plant.

Power plants typically include a variety of different turbomachines and/or systems that are used to generate a power output. Two conventional power systems used to generate power include gas turbine systems and combined cycle power plants, which typically include a gas turbine system(s). Conventional combined cycle power plants employ one or multiple gas turbine system(s) operatively coupled to one or multiple steam turbine system(s). The gas turbine system includes a compressor coupled to a gas turbine. The gas turbine is usually coupled to and drives an external component, such as a generator, for producing a load or power output. The steam turbine system includes a high pressure (HP) turbine portion operatively coupled to an intermediate pressure (IP) turbine portion that, in turn, is coupled to a low pressure (LP) turbine. Similar to the gas turbine of the gas turbine system, the HP, IP and LP turbines are employed to drive an external component (e.g., generator). In a typical combined cycle power plant, exhaust gas from the gas turbine is passed to a heat recovery steam generator (HRSG), which may be used to produce and reheat steam to the various turbines of the steam turbine system for enhanced efficiency of the system and/or power plant. Downstream of the HRSG the exhaust gas is released to the atmosphere through a stack.

The increased availability of alternative energy sources, such as various forms of renewable energy, has also increased the complexity of operating combined cycle power plants. Fluctuations in power generation demand on a combined cycle power plant often require the system to shift between different load conditions, varying the amount of generated power over time. The operation of a power plant at different amounts of load may affect several attributes of the power plant, including the internal temperature of various components and/or fuel consumption. In some cases, extended operation at varying loads may adversely affect efficiency or useful life of some components.

BRIEF DESCRIPTION

A first aspect of the disclosure provides a method for operating a combined cycle power plant (CCPP), the method including: operating the CCPP at an ambient condition and a load condition; generating a power plant model of the CCPP for operating at the ambient condition and the load condition; modeling a fuel consumption using a baseline control profile and the power plant model of the CCPP at the ambient condition and the load condition; creating a variant control profile for the CCPP; determining, using the power plant model, whether the variant control profile meets a quality threshold for the CCPP, the quality threshold including at least a fuel efficiency of the CCPP; modifying the variant control profile in response to the variant control profile not meeting the quality threshold; and adjusting the CCPP to use the variant control profile in response to the variant control profile meeting the quality threshold, wherein the variant control profile adjusts a turbine section inlet temperature schedule or an exhaust temperature schedule for the CCPP.

A second aspect of the disclosure provides a program product stored on a computer readable storage medium for operating a combined cycle power plant (CCPP), the computer readable storage medium having program code for causing a computer system to perform actions including: operating the CCPP at an ambient condition and a load condition; generating a power plant model of the CCPP for operating at the ambient condition and the load condition; modeling a fuel consumption using a baseline control profile and the power plant model of the CCPP at the ambient condition and the load condition; creating a variant control profile for the CCPP; determining, using the power plant model, whether the variant control profile meets a quality threshold for the CCPP, the quality threshold including at least a fuel efficiency of the CCPP; modifying the variant control profile in response to the variant control profile not meeting the quality threshold; and adjusting the CCPP to use the variant control profile in response to the variant control profile meeting the quality threshold, wherein the variant control profile adjusts a turbine section inlet temperature schedule or an exhaust temperature schedule for the CCPP.

A third aspect of the disclosure provides a system including: a combined cycle power plant (CCPP) having at least a gas turbine, a heat recovery steam generator (HRSG), a steam turbine (ST), and a condenser; and a system controller in communication with the gas turbine and the HRSG of the CCPP, the system controller being operable to: operate the CCPP at an ambient condition and a load condition; generate a power plant model of the CCPP for operating at the ambient condition and the load condition; model a fuel consumption using a baseline control profile and the power plant model of the CCPP at the ambient condition and the load condition; create a variant control profile for the CCPP; determine, using the power plant model, whether the variant control profile meets a quality threshold for the CCPP, the quality threshold including at least a fuel efficiency of the CCPP; modify the variant control profile in response to the variant control profile not meeting the quality threshold; and adjust the CCPP to use the variant control profile in response to the variant control profile meeting the quality threshold, wherein the variant control profile adjusts a turbine section inlet temperature schedule or an exhaust temperature schedule for the CCPP.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
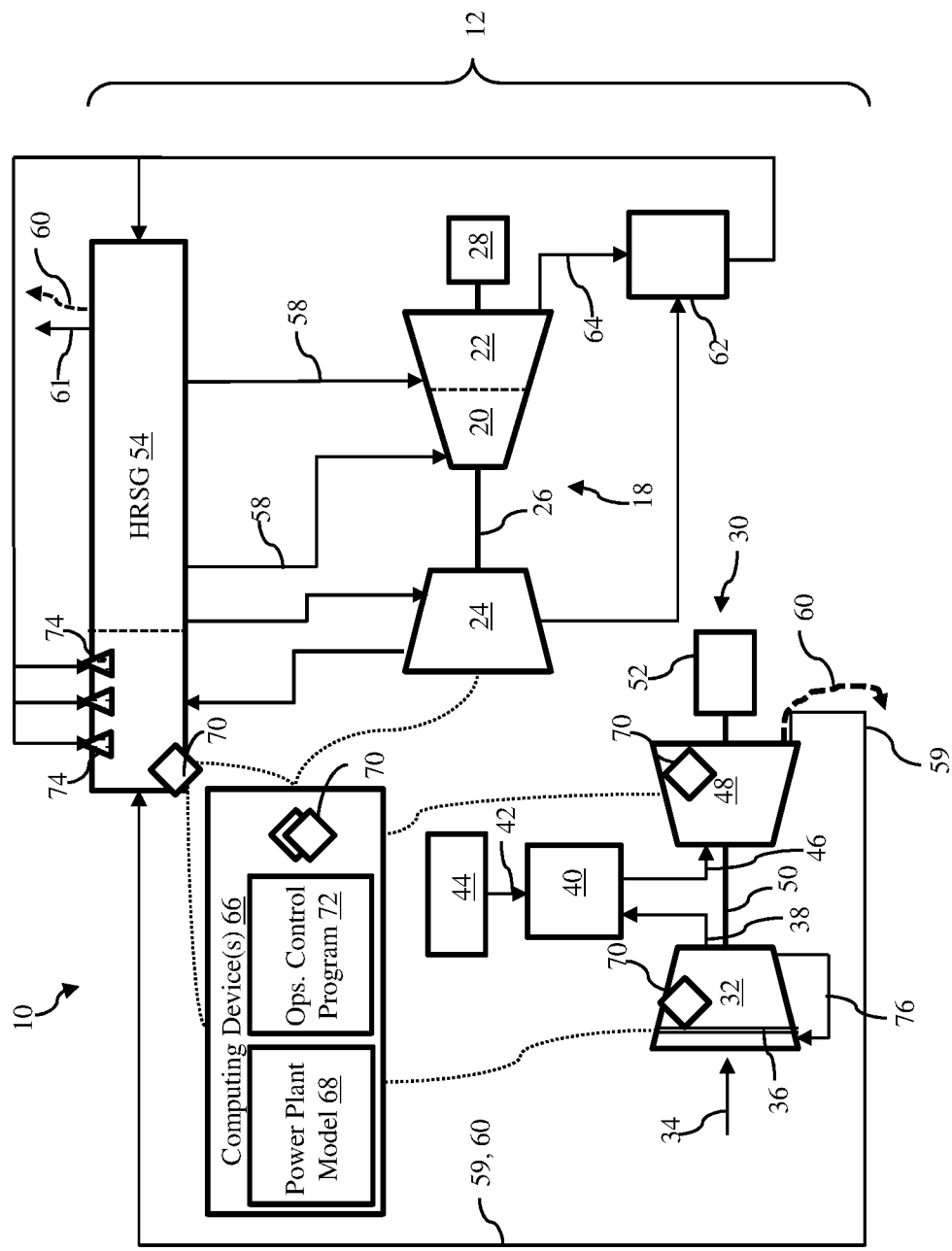
FIG. 1 is a schematic view of a system with a combined cycle power plant (CCPP) according to various embodiments of the disclosure.

As an initial matter, in order to clearly describe the current technology it will become necessary to select certain terminology when referring to and describing relevant machine components within the various systems, components, and other embodiments of the disclosure. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the present disclosure provide methods, program products, and systems for controlling various attributes of a combined cycle power plant (CCPP) to compensate for transient load operation, i.e., the power output from the CCPP varying with respect to time. Embodiments of the disclosure may include, e.g., generating a power plant model of the CCPP for operating at an ambient condition and a load condition. The generating of such a model may include verifying the model's accuracy based on the present and/or historical operating data for the CCPP. The method may include using the model to model a fuel consumption of the CCPP using a baseline control profile, and thereafter creating a variant control profile which defines alternative operating and/or control settings for several loads. The method may include determining whether the variant control profile meets one or more quality thresholds for the CCPP, and adjusting the CCPP to use the variant control profile in cases that meet these requirements. The adjusting of the CCPP may include adjusting variables such as turbine inlet temperature(s) (also known in the art as the "firing temperature"), exhaust temperature(s), and/or other variables affecting the power output and operating characteristics of the CCPP.

FIG. 1 shows a schematic depiction of a system 10 according to various embodiments of the disclosure. As shown, system 10 can include a combined cycle power plant 12 (hereafter, "CCPP 12") including a steam turbine (ST) system 18, which in the depiction shown, can include a high pressure (HP) portion 24, an intermediate pressure (IP) portion 20 and a low pressure (LP) portion 22, as is known in the art. HP portion 24, IP portion 20 and LP portion 22 of ST system 18 may be coupled and/or positioned on and/or may be configured to rotate a shaft 26 to produce mechanical work and/or to drive an additional component of ST system 18. As shown in FIG. 1, shaft 26 of ST system 18 may be coupled to and/or may drive an external component, and more specifically, a generator 28 configured to generate power and/or produce a load.

CCPP 12 can further include a gas turbine (GT) system 30. GT system 30 may include a compressor 32. Compressor 32 compresses an incoming flow of fluid 34 (e.g., air) as it flows through compressor 32. Compressor 32 may include a plurality of stages of stator vanes (not shown) and rotating blades (not shown) positioned within compressor 32. The stator vanes and rotating blades positioned within compressor 32 may be configured to aid in moving and/or passing fluid 34 through compressor 32. Compressor 32 may include a set of inlet guide vanes (IGVs) 36. IGVs 36 are a type of vane structured specifically to direct the incoming flow of operating fluid onto the rotating blades of compressor 32. IGVs 36 may be adjustable between several positions to affect the flow rate, incident angle, and/or other properties of fluid entering compressor 32. IGVs 36 thus may be capable of affecting the temperature of compressor 32, the power output from GT system 30, and/or other properties. Compressor 32 delivers a flow of compressed fluid 38 (e.g., compressed air) to a combustor 40. Combustor 40 mixes the flow of compressed fluid 38 with a pressurized flow of fuel 42 provided by a fuel supply 44 and ignites the mixture to create a flow of combustion gas 46. The flow of combustion gas 46 is in turn delivered to a turbine component 48, which typically includes a plurality of stages of stator vanes (not shown) and turbine blades (not shown), similar to compressor 32. The flow of combustion gas 46 drives turbine component 48 to produce mechanical work. The mechanical work produced in turbine component 48 drives compressor 32 via a shaft 50, and may be used to drive a generator 52 (e.g., external component) configured to generate power and/or produce a load.

Although CCPP 12 is shown in FIG. 1 to include a dual-shaft configuration where two separate generators 28, 52 are utilized, it is understood that in other non-limiting examples, ST system 18 and GT system 30 may share a single shaft and in turn, may share a single generator. Additionally, although CCPP 12 is shown to only include a single ST system 18 and single GT system 30, it is understood that CCPP 12 may include a plurality of ST systems 18 and/or GT system(s) 30 that may be configured to generate an operational load and/or power output.

CCPP 12 can further include a heat recovery steam generator (HRSG) 54 fluidly connected with ST system 18 (e.g., with HP portion 24 and/or IP portion 20 and/or LP portion 22) and GT system 30. As shown in the non-limiting example of FIG. 1, HRSG 54 may be fluidly connected and/or coupled with ST system 18 via supply conduits 58 to provide steam to the portions of ST system 18 via supply conduits 58. Additionally in the non-limiting example of FIG. 1, HRSG 54 may be fluidly connected and/or coupled with GT system 30 via an exhaust channel 59 coupled to and/or in fluid communication with turbine component 48. Exhaust channel 59 may provide exhaust fluid 60 (e.g., gas) from GT system 30 to HRSG 54 to be utilized in generating and/or heating steam for ST system 18. A stack 61 of HRSG 54 may exhaust or release (excess or used) gas (e.g., exhaust fluid 60) and/or fluid from HRSG 54 into the atmosphere and/or out of CCPP 12.

CCPP 12 can further include a condenser 62. Condenser 62 may be in fluid communication and/or may be fluidly coupled with various components of CCPP 12. In a non-limiting example, condenser 62 may be fluidly connected and/or coupled to LP portion 22 of ST system 18 via steam exhaust duct 64. Condenser 62 may be configured to condense exhaust flow and/or bypass flow (e.g., line connecting HP 24 to condenser 62) from ST system 18 and/or HRSG 54, and providing a condensed fluid (e.g., condensate water) to HRSG 54, as is known in the art.

As shown in FIG. 1, system 10 can include at least one computing device 66 configured to generate (i.e., create and verify) a power plant model, and/or directly control the operation of, CCPP 12. Computing device(s) 66 can be hard-wired and/or wirelessly connected to and/or in communication with CCPP 12, and its various components (e.g., ST system 18, GT system 30, HRSG 54 and so on) via any suitable electronic and/or mechanical communication component or technique. Computing device(s) 66, and its various components discussed herein, may be a single stand-alone system that functions separate from another power plant control system (e.g., computing device) (not shown) that may control and/or adjust operations and/or functions of CCPP 12, and its various components (e.g., ST system 18, GT system 30 and so on). Alternatively, computing device(s) 66 and its components may be integrally formed within, in communication with and/or formed as a part of a larger power plant control system (e.g., computing device) (not shown) that may control and/or adjust operations and/or functions of CCPP 12, and its various components (e.g., ST system 18, GT system 30 and so on).

In various embodiments, computing device(s) 66 can generate (i.e., create and/or verify) a power plant model 68 of CCPP 12. Power plant model 68 may model or otherwise simulate many aspects of CCPP 12 operation, including performance, economic variables, environmental data, and/or other attributes of CCPP 12. In some instances, power plant model 68 may be known as or referred to as a "digital twin" or "digital model," and such terms are understood to be particular forms of power plant model 68 in various embodiments. Computing device 66 may be communicatively coupled to one or more sensors 70, as described herein, for provide input data for modeling and/or controlling CCPP 12. As discussed herein, computing device 66 can generate and/or modify power plant model 68. Computing device(s) 66 may rely upon the analysis and/or output from power plant model 68, as discussed below to control CCPP 12 and/or its various components to affect the operation of CCPP 12. For example, and as discussed herein, power plant model 68 may simulate various operational characteristics and/or settings of CCPP 12 (including ST system 18, GT system 30, HRSG 54, etc.) and the components included therein, to control the operation of system 10 and/or affect various attributes thereof.

In some cases, computing device 66 may include an operational control program ("Ops. Control Program") 72 for interacting with and/or controlling various aspects of system 12. Operational control program 72 may take the form of any currently known or later developed control system for managing the operation of a power plant, e.g., a proportional-integral-derivative (PID) controller for managing transient operation of CCPP 12. Operational control program 72 additionally or alternatively may include a PID sub-system configured to operate selectively during various power generation modes of CCPP 12. A PID controller or sub-system, refers to a system configured to calculate an error value on a continuous basis as the difference between a desired target value and one or more predetermined variables. In the case of a PID controller, operational control program 72 may operate by detecting variance between one or more variable(s) and a corresponding target (e.g., in power plant model 68) and applying a corrective adjustment, i.e., instructions to vary one or more properties of CCPP 12, such as a component temperature, valve position, and/or other adjustable operating parameters. According to an example, the corrective adjustment by operational control program 72 may modify an instruction by computing device(s) 66, e.g., to adjust a valve controlling the flow of fuel to a 90% capacity position, into a corrected instruction to adjust the valve to a 70% capacity position to reduce the firing temperature and/or combustion rate(s) of GT system(s) 30. Operational control program 72 thus may amplify or mitigate corrective actions output from other algorithms and/or controllers of CCPP 12, and/or may modify CCPP 12 to use the settings in power plant model 68. However implemented, corrective adjustments by operational control program 72 may be calculated from the variable(s) and target(s) based on proportional, integral, and derivative terms using variables within power plant model 68, those measured by sensor(s) 70, and/or other information within computing device(s) 66 and/or other devices in communication therewith.

As shown in FIG. 1, computing device(s) 66 may include and/or may be in electrical and/or mechanical communication with sensor(s) 70, as well as many other additional and/or intermediate components such as valves, solenoids, actuators, converters, etc. (not shown) positioned throughout system 10. As shown in the non-limiting example of FIG. 1, and discussed herein, at least one sensor 70 of and/or connected to computing device(s) 66 may be positioned within ST system 18, GT system 30, HRSG 54 and/or one or more subcomponents of system 10 as discussed elsewhere herein. Sensor(s) 70 in communication with computing device(s) 66 of system 10 may be any suitable sensor or device configured to detect and/or determine data, information, and/or operational characteristics relating to CCPP 12 during operation. For example, and as discussed herein, sensor(s) 70 positioned within HRSG 54 of CCPP 12 may be any suitable sensor configured to detect and/or determine the properties of a working fluid (e.g., steam, exhaust fluid 60). Such properties may include the working fluid temperature within portions and/or components of HRSG 54 including ST system 18 and/or GT system 30, temperatures of component(s) of HRSG 54 of CCPP 12, and/or steam flow measurements of steam flowing through HRSG 54. In non-limiting examples, sensor(s) 70 may be configured as, but not limited to, thermometers, thermistor, thermocouples, and/or any other mechanical/electrical temperature sensors.

Figure 2:
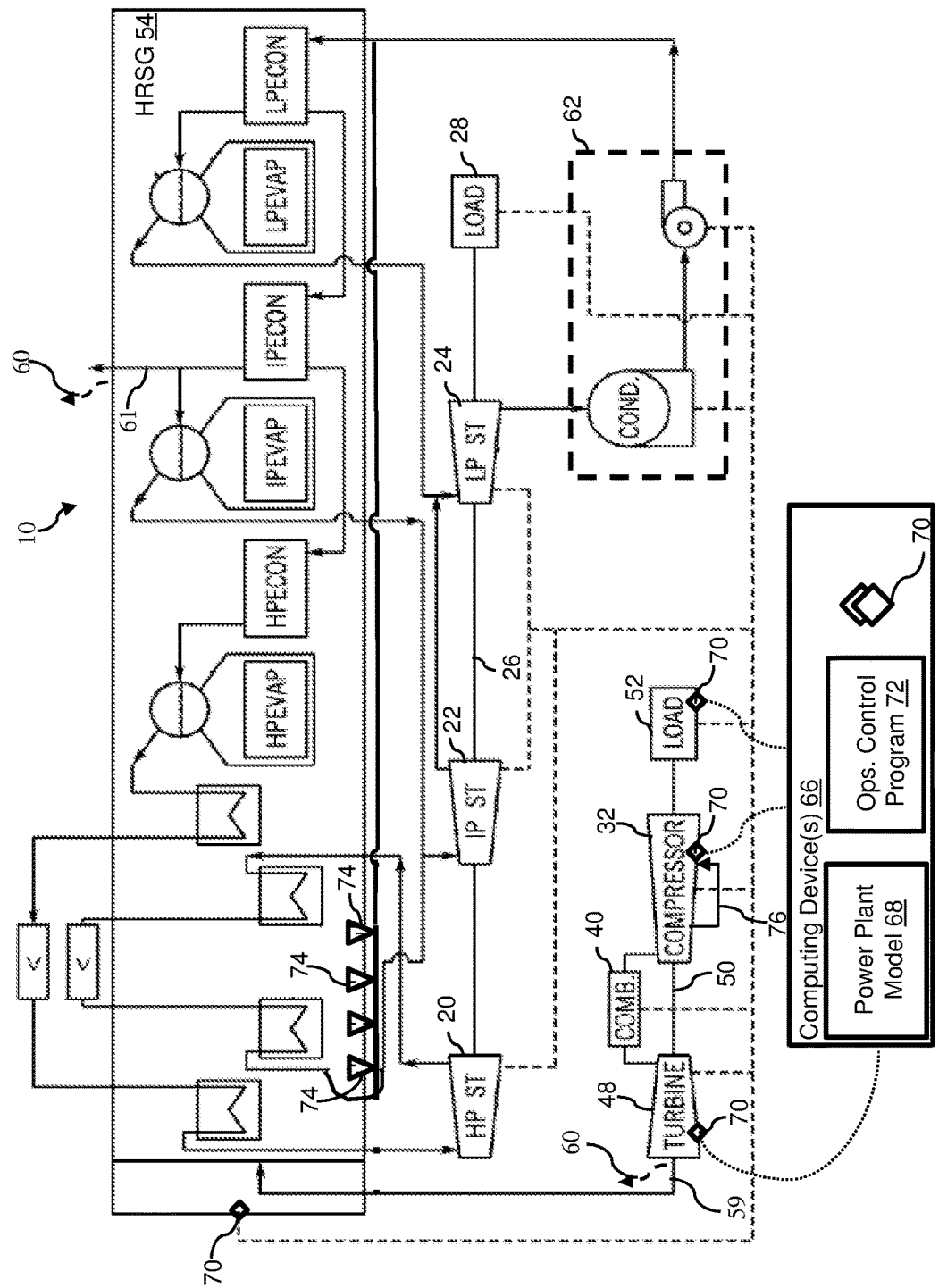
FIG. 2 is an expanded schematic view of a system and CCPP according to various embodiments of the disclosure.
Figure 3:
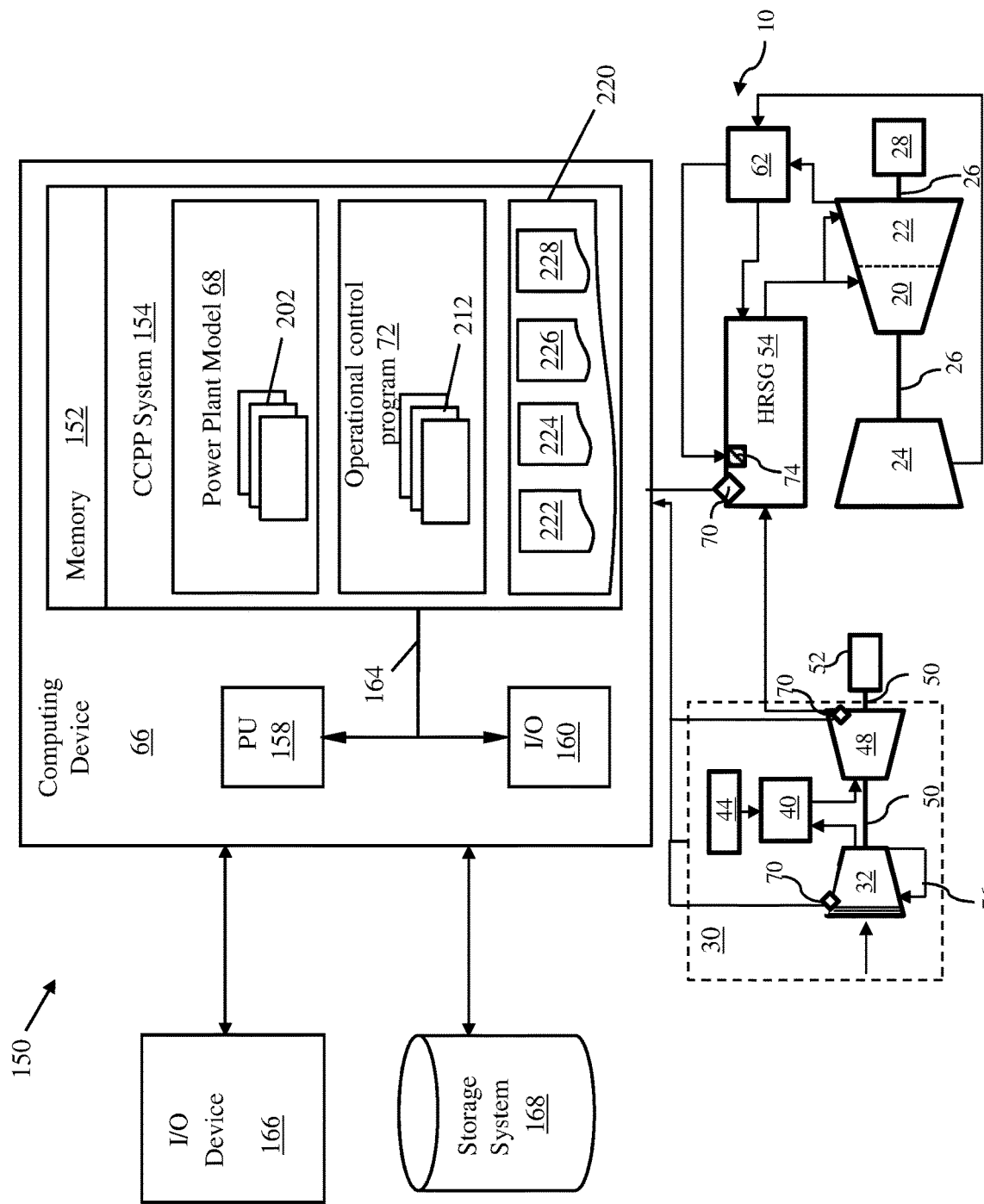
FIG. 3 shows an example computer environment operable to control a CCPP according to embodiments of the present disclosure.

Although three sets of sensors 70 are shown, it is understood that system 10 may include more sensors 70 (e.g., as shown in FIGS. 2, 3) that may be configured to provide computing device(s) 66, and specifically operational control program 72, with information or data relating to the temperature or pressure of the fluids and components included within HRSG 54, and/or fluid flow measurements. The number of sensors 70 shown in FIG. 1 is merely illustrative and non-limiting. As such, system 10 may include more or fewer sensors 70 than depicted in FIG. 1 or other figures.

Referring to FIG. 2, an expanded schematic view of system 10 (FIG. 1) is shown to further illustrate various embodiments of the disclosure. System 10 may include, e.g., ST system 18 and GT system 30 mounted together on shaft 26. Embodiments of the disclosure provide operational methodologies, as well as related program products and systems, for operation of CCPP 12 at various amounts of load (i.e., "load conditions") and at various ambient conditions. In some cases, CCPP 12 may operate at a sustained load which provides a constant output of power to meet all or a portion of a customer's demands, and within predetermined power generation boundaries determined based on a design specification for CCPP 12. In other cases, CCPP 12 may operate at non-sustained amounts of load under conditions different from the operating specification of CCPP 12, for at least a threshold time period. The varying load conditions may be chosen to meet varying customer demands on CCPP 12.

As electrical grids diversify to include a wider variety of power sources, operation CCPP 12 or other systems at fixed load conditions has become less common. However, conventional implementations of CCPP 12 may not be structured to operate at such settings for extended time periods. CCPP 12 in some cases may operate predominantly in transient operating settings when used in the same grid as alternative power sources such as solar power, wind power, geothermal power, etc. Embodiments of the disclosure provide a methodology for modeling and controlling the operation of CCPP 12 to maintain desired parameters and/or levels of efficiency when operating under conditions that differ from those contemplated in its design specifications.

Embodiments of the disclosure also account for differences in the operation of CCPP 12 under different "ambient conditions," i.e., differences in the temperature, pressure, and/or other attributes of the setting where CCPP 12 is operating. For example, CCPP 12 may be operating in an area where the temperature is between approximately fifteen degrees Celsius (° C.) and twenty-five ° C. Embodiments of the disclosure may distinguish between different ambient conditions based on predetermined temperature ranges (e.g., of approximately five ° C.) above or below another ambient condition. Thus, the "ambient condition" refers to a characterization of external variables (temperatures, pressures, etc.) within a particular embodiment, and not within user control. Higher temperatures may affect variables such as inlet temperature, exhaust temperature, fluid flow, heat rate, etc., throughout various subcomponents of CCPP 12. Similar variations to the above-noted and/or other variables of CCPP 12 may result from higher or lower operating pressures. In any case, the variations caused by the ambient condition of CCPP 12 may be independent of the load condition of CCPP 12.

According to embodiments, system 10 may include CCPP 12 operating varying load conditions and/or ambient conditions. As the power output of CCPP 12 varies across operating conditions, CCPP may produce its maximum output, a reduced output, etc. In such cases, the power generated by systems 18, 30 may cause subcomponents of each system 18, 30 to exhibit sustained temperatures, pressures, flow rates, etc., that are significantly different from their intended values. In an example implementation, the exhaust temperature of turbine component 48 may be significantly greater than the upper limit of a range of target exhaust temperatures. This situation may be associated with undesired consequences, such as greater than expected temperatures of fluid flowing through HRSG 54. In conventional settings, one or more attemperators 74 would divert water from HRSG 54 to cool fluid(s) herein. The water diverted into HRSG 54 by attemperators 74 may produce operating inefficiencies, as the diverted water becomes unavailable for use in HRSG 54 for steam production, or more generally, in CCPP 12.

To improve operation at varying ambient conditions and/or load conditions, computing device(s) 66 and/or operational control system(s) 72 coupled to system(s) 18, 30 may rely on power plant model 68 to adjust the control profile of GT system 30, thereby changing parameters such as firing temperature, exhaust temperature, etc., during its operation. Where applicable, the variant control profile may be implemented, e.g., by direct cooling of turbine component 48, reduction in firing temperature of combustor(s) 40, and/or other operations discussed herein for reducing exhaust temperature while maintaining a similar or identical power output. The generation and verification of power plant model 68, in turn, may be based on monitoring and modeling the firing rate, exhaust temperatures, and/or heat rates within turbine component 48 based on load and ambient conditions, and further modeling other parameters of GT system 30 based on the modeled variables. In various embodiments, operational control system 72 may modify further operational parameters such as IGV 36 position, a fluid flow through an inlet bleed heat (IBH) line 76, and/or other operational parameters to further increase CCPP 12 efficiency and/or bring CCPP 12 into operational alignment with power plant model 68.

Referring to FIGS. 2 and 3 together, an illustrative environment 150 for operating system 10 and sub-components thereof is illustrated with a simplified depiction of CCPP 12. As shown, environment 150 can include computing device 66, which may include a memory 152 with a CCPP system 154 operating thereon. CCPP system 154 may be a software system integrating the features of power plant model 68 and/or operational control program 72 as sub-systems thereof. In further examples, power plant model 68 and/or operational control program 72 may be independent of each other and/or implemented using different computing devices 66. Computing device 66 may be an independent component as shown, or may be included as part of power plant model 68 as previously described. Environment 150 as shown in FIG. 3 represents one type of configuration for controlling CCPP 12. As discussed herein, power plant model 68 of computing device 66 may simulate the operation of CCPP 12 while operating at a set of ambient and load conditions. Operational control program 72 may include components for modifying the operation of CCPP 12, e.g., by providing and implementing a variant control profile output from power plant model 68. Embodiments of the present disclosure may be configured or operated in part by a technician, computing device 66, and/or a combination of a technician and computing device 66. It is understood that some of the various components shown in FIG. 3 can be implemented independently, combined, and/or stored in memory for one or more separate computing devices that are included in computing device 66. Further, it is understood that some of the components and/or functionality may not be implemented, or additional schemas and/or functionality may be included as part of CCPP system 154.

Computing device 66 can include a processor unit (PU) 158, an input/output (I/O) interface 160, memory 152, and a bus 164. Further, computing device 66 is shown in communication with an external I/O device 166 and a storage system 168. CCPP system 154 may provide power plant model 68, which in turn can operate using various modules 202 (e.g., a calculator, a determinator, a comparator, etc.) for implementing various functions and/or logical steps. CCPP system 154 additionally or alternatively may provide operational control program 72 with its own set of modules 212 (e.g., a calculator, determinator, comparator, etc.) for implementing respective functions and/or steps of operational control program 72. The various modules 202, 212 can use algorithm-based calculations, look up tables, and similar tools stored in memory 152 for processing, analyzing, and operating on data to perform their respective functions. In general, PU 158 can execute computer program code to run software, such as CCPP system 154, which can be stored in memory 152 and/or storage system 168. While executing computer program code, PU 158 can read and/or write data to or from memory 152, storage system 168, and/or I/O interface 160. Bus 164 can provide a communications link between each of the components in computing device 66. I/O device 166 can comprise any device that enables a user to interact with computing device 66 or any device that enables computing device 66 to communicate with the equipment described herein and/or other computing devices. I/O device 166 (including but not limited to keyboards, displays, pointing devices, etc.) can be coupled to controller 160 either directly or through intervening I/O controllers (not shown).

Memory 152 can also include various forms of data 220 pertaining to CCPP 12 or more specifically system(s) 18, 30 of CCPP 12. As discussed elsewhere herein, power plant model 68 can simulate the operation of CCPP 12 at particular ambient and/or load conditions, while operational control program 72 can adjust exhaust temperature, firing temperature, relative load, and/or other operating parameters of CCPP 12 to implement one or more variant control profiles output from power plant model 68. To implement methods according to the disclosure, CCPP system 154 can store and interact with data 220 subdivided into various fields. For example, ambient condition field 222 can store data pertaining to ambient conditions for CCPP at various temperatures, pressures, and/or other environmental variables independent of CCPP 12 specifications. Data 220 can also include a load condition field 224 for cataloguing specification data for operating at various levels of output, including fixed and non-fixed outputs. A set of control profiles for CCPP 12 can be stored in a control profile field 226 which can include one or more sets of operating parameters (e.g., temperatures, pressures, flow rates) and/or ranges of these parameters representing the intended and/or safe operating settings for components of CCPP 12 at various ambient and/or load conditions. The values for each parameter stored in control profile field 226 can in some cases be based on calibrated data and/or simulated values from power plant model 68 for one or more parameters during non-base load operation. It is thereby understood that data 220 can include several measured and/or calculated variables that can be applied to and/or stored in control profile field 226 to control the operation of CCPP 12. Data 220 may also include, e.g., a quality threshold field 228 for cataloguing quality thresholds such as a minimum improvement to CCPP 12 performance (e.g., heat rate reduction, plant efficiency increase, fuel consumption reduction, plant capacity increase, etc.), compliance with emissions limits (e.g., NOx emissions, CO emissions, etc.), compliance with operational stability limits (e.g., compressor operability limits, combustion stability limits, gas turbine firing temperature(s), gas turbine exhaust temperature(s), turbine shaft torque limits for system(s) 18, 30, operational limits of HRSG 54, operational limits for ST system 18, condenser pressure limits, etc.), and/or other operational quality metrics for CCPP 12. As noted herein, quality threshold field 228 may define one or more parameters which CCPP 12 must meet in order to shift from one control profile to another.

Computing device 66 can comprise any general purpose computing article of manufacture for executing computer program code installed by a user (e.g., a personal computer, server, handheld device, etc.). However, it is understood that computing device 66 is only representative of various possible equivalent computing devices and/or technicians that may perform the various process steps of the disclosure. In addition, computing device 66 can be part of a larger system architecture operable to model and/or control various aspects and elements of CCPP 12.

To this extent, in other embodiments, computing device 66 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 66 may include a program product stored on a computer readable storage device, which can be operative to automatically control elements of CCPP 12 (e.g., systems 18, 30, HRSG(s) 54, etc.) when executed.

Figure 4:
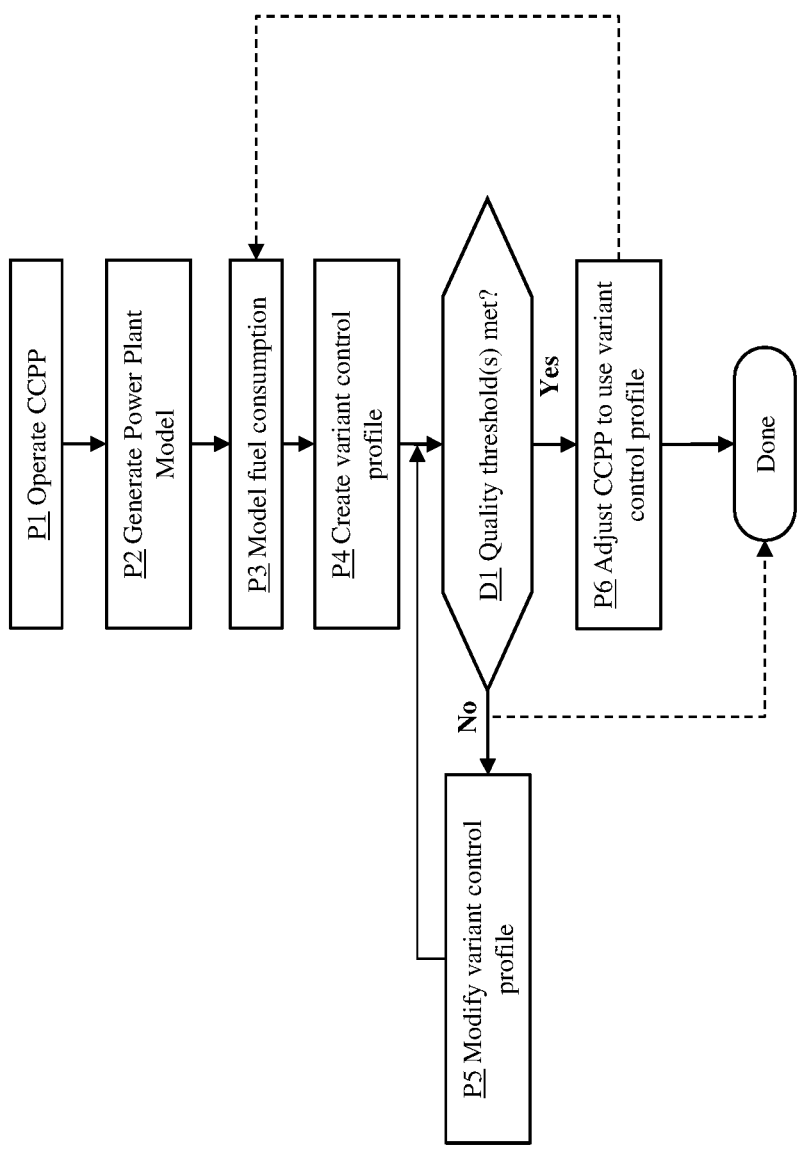
FIG. 4 provides an illustrative flow diagram of a method for operating a CCPP according to embodiments of the present disclosure.

Referring to FIGS. 2-4, embodiments of the disclosure provide a method to operate CCPP 12, e.g., using power plant model 68 and operational control program 72. According to a specific example, FIG. 4 provides a flow diagram for controlling the operation of CCPP 12 in the example configuration shown, though control of CCPP 12 in other configurations is also possible using embodiments of the example process flow shown in FIG. 4. Embodiments of the methodologies described herein may be implemented, e.g., using power plant model 68 and operational control system 72 of computing device 66, and/or various modules and/or subcomponents of computing device 66, power plant model 68, or operational control system 72. Methods according to the disclosure may also rely on other components such as sensor(s) 70 in communicatively coupled to computing device 66 and/or power plant model 68 to measure and/or otherwise determine various parameters to be used as a basis for the processes discussed herein. As discussed herein, environment 150 may be operable to model and adjust various operational parameters of CCPP 12, e.g., by modifying various operating parameters of system(s) 18, 30, HRSG 54, etc., to control fluid flow therethrough. In still further embodiments, power plant model 68 may be operable to modify other instructions and/or actions undertaken via computing device 66 and/or power plant model 68, e.g., by creating one or more variant control profiles which modify the rate at which various parameters change over time and/or with respect to changes in power output. The illustrative flow diagram in FIG. 4 is shown with several processes organized in an example flow, but it is understood that one or more processes may be implemented simultaneously and/or sequentially, and/or executed in any alternative order while maintaining the various technical features described by example herein.

To initiate methods according to the disclosure, process P1 may include causing CCPP 12 to operate at a particular load condition and ambient condition. The load condition may refer to the power output from CCPP 12 during operation, and may include fixed or non-fixed loads to accommodate varying circumstances. As examples, a load condition for CCPP 12 may include peak load operation, base load operation, reduced load operation, variable load operation, and/or extended transient operation of CCPP 12. The ambient condition for operating CCPP 12 may refer to the external temperature, pressure, and/or other external variables affecting the operation of CCPP 12. The ambient condition of CCPP 12 may include, e.g., specification temperature operation, raised temperature operation, reduced temperature operation, transient temperature, operation, etc. Various load conditions, ambient conditions, and/or combinations thereof may cause CCPP 12 to exhibit operational parameters (e.g., temperatures, pressures, and flow rates) that differ significantly from their specification levels. Further processes according to the disclosure may simulate the operation of CCPP 12, and in some cases, modify the operation of CCPP 12 to prevent inefficient operation, greater than desired use of cooling fluid(s) and/or components, and/or to avoid negative consequences of operating outside specified ranges.

During operation of CCPP 12, embodiments of the disclosure may include generating power plant model 68 of CCPP 12. As used herein, the term "generating" may include one or more processes for simulating the operation of CCPP 12 under a particular load condition and ambient condition, changing of an existing power plant model 68 to "as running" conditions, correcting of an existing power plant model 68 to "as running" conditions, tuning of an existing power plant model 68 to "as running" conditions, calibrating of an existing power plant model 68 to "as running" conditions, and additionally or alternatively verifying the accuracy of power plant model 68 based on concurrent operating data for CCPP 12 and/or other forms of data suitable for verifying the accuracy of power plant model 68. In addition to verifying the accuracy of power plant model 68 based on concurrent operating data for CCPP 12 and/or other forms of data suitable for verifying the accuracy of power plant model 68. In the case of verifying based on comparing power plant model 68 to CCPP 12 operation, process P2 may include indicating whether power plant model 68 is valid based on whether one or more modeled parameter(s) of CCPP 12 are similar to (i.e., equal to or within a predetermined margin of error) to the actual CCPP 12 parameters. Such verification additionally or alternatively may include changing power plant model 68 to account for discrepancies between model parameters and actual CCPP 12 parameters, and subsequently verifying whether power plant model 68 is accurate after such adjustments occur. The terms "generating" and/or "changing," with respect to power plant model 68, also encompass actions such as "correcting or calibrating or tuning or updating" the power plant model as CCPP plant performance changes over time, e.g., due to degradation, changes, upgrades, etc. In such cases, terms such as "as-running tuned power plant model" may refer to further revising an existing model to arrive at a desired control profile. Process P2 thus may include determining whether power plant model 68 is acceptably accurate, e.g., based on meeting or exceeding a predetermined amount of accuracy (e.g., percentage of modeled parameters in compliance with CCPP 12, optionally over a predetermined time interval). Power plant model 68, once verified, may represent a baseline set of operating parameters for CCPP 12.

Embodiments of the disclosure may include modeling a fuel consumption of CCPP 12 using power plant model 68. The amount of fuel consumption may be with respect to a particular time interval for operating CCPP 12, and with respect to the above-noted ambient and/or load conditions for CCPP 12. The fuel consumption of CCPP 12 may be expressed as, e.g., a total amount of fuel expected to be consumed over a particular time interval at the modeled load condition and ambient condition. Additionally or alternatively, the fuel consumption modeled in process P3 may be expressed as a percent efficiency, a percentage of fuel consumed relative to desired levels, other load conditions and/or ambient conditions. The fuel consumption modeled in process P3 thus may include any conceivable metric for modeling the amount of fuel consumed by CCPP 12.

Continuing to process P4, embodiments of the disclosure may include using power plant model 68 to create a variant control profile for CCPP 12. The variant control profile may be created in process P4 by any conceivable modeling operation, based on various operating parameters included within and/or modeled by power plant model 68. The variant control profile may include several operational parameters and/or ranges of operational parameters which differ from their present values in power plant model 68. Such parameters may include one or more of firing temperatures, inlet temperatures, outlet temperatures, inlet guide vane (IGV) pitch angle, inlet bleed heat (IBH) volume, firing rate, etc. The variant control profile may include, e.g., a load path for CCPP 12 that is different from the actual load path of CCPP 12 during its operation. Such variations of the load path of CCPP 12 may be any modified load path that does not violate any specification boundaries for CCPP 12. The variant control profile may be biased based on an operating schedule for CCPP 12, e.g., to shift the operation of CCPP 12 and/or its subcomponents toward hotter or colder values of exhaust temperature, firing temperature, etc. The magnitude or direction of the parameter shift within the variant control profile may be determined, e.g., by random selection of a bias size and/or direction, and/or by applying predetermined logic for variant control profiles that are more likely to improve the operation of CCPP 12. Such logic may be based on power plant model 68, actual parameters of CCPP 12, and/or other variables or models relevant to CCPP 12.

The variant control profile created in process P4 may include proposed temperature increases and/or reductions within the load path of CCPP 12. In some cases, one or more quality thresholds of CCPP 12 may improve by reducing the load path temperature within CCPP 12. In such cases, the variant control profile may produce reducing the exhaust temperature/energy, thereby routing less fluid through attemperator(s) 74, and improving CCPP 12 efficiency by reducing fuel consumption for a fixed load. Such cases may include, e.g., low loads in which exhaust flow through CCPP 12 is high but exhaust temperature within ST system 10 and/or GT system 30 is low. In other cases, the variant control profile may increase the temperature within the load path of CCPP 12. Specifically, the variant control profile may propose a higher temperature within the inlet, exhaust, and/or other sections of ST system 10 and/or GT system 30. Such a modification may be desired in cases where CCPP 12 operates at higher-than-specification loads. Although several variant control profiles to improve efficiency, fuel consumption, system health, etc., may be possible at a particular time, process P4 may require any variant control profiles to have a minimum projected improvement before power plant model is applied to control CCPP 12.

After a variant control profile is created from power plant model 68 in process P4, methods according to the disclosure may include several decisions for determining whether to modify the operation of CCPP 12 based on the variant control profile created in process P4. At decision D1, modules 212 of operational control program 72 may evaluate whether applying the variant control profile to CCPP 12 will continue to meet a quality threshold for CCPP 12 (e.g., maximum values of temperature, pressure, temperature, fuel consumption, etc.). According to an example, the quality threshold may be expressed as whether fuel consumption by CCPP 12 is reduced by at least a threshold amount. In this case, the reduction in fuel consumption may be defined as a percentage (e.g., at least approximately 1% reduction in fuel consumption over a specified timespan). In further examples, the quality threshold may include additional threshold improvements to CCPP 12 operation, e.g., a minimum heat rate reduction, a minimum plant efficiency increase, compliance with an emissions limit, and/or compliance with an operating stability limit for CCPP 12. The "emissions limit" may refer to a maximum allowable level of carbon dioxide and/or nitrogen oxide emissions levels for CCPP 12. The "operating stability limit" may refer a maximum amount by which the variant control profile reduces the expected lifespan and/or exceeds specification limits for CCPP 12 and/or its subcomponents. As noted herein, the quality threshold(s) evaluated in decision D1 and stored in quality threshold field 228 may include metrics such as a minimum improvement to CCPP 12 performance (e.g., heat rate reduction, plant efficiency increase, fuel consumption reduction, plant capacity increase, etc.), compliance with emissions limits (e.g., NOx emissions, CO emissions, etc.), compliance with operational stability limits (e.g., compressor operability limits, combustion stability limits, gas turbine firing temperature(s), gas turbine exhaust temperature(s), turbine shaft torque limits for system(s) 18, 30, operational limits of HRSG 54, operational limits for ST system 18, condenser pressure limits, etc.), and/or other operational quality metrics for CCPP 12.

In cases where the variant control profile does not meet the quality threshold (i.e., "No" at decision D1), the method may proceed to process P5 of modifying the variant control profile. Such modifications may be random changes, and/or may be based on a schedule of possible changes governed by logic within power plant model 68, and/or may be based on results of plant power plant model ("e.g., a "digital twin") based experimentation and/or computations. In cases where the quality threshold is met (I.e. "Yes" at decision D1), the method may continue to further operations for applying the variant control profile to CCPP 12. In some cases, methods according to the disclosure may test only a predetermined number of variant control profiles (e.g., five, ten, fifty, or one hundred or more variant control profiles). In such an example, the method may conclude ("Done") after decision D1 indicates that none of the tested variant control profiles meet the relevant quality threshold(s).

In cases where the variant control profile meets the quality threshold, methods according to the disclosure may include process P6 in which operational control system 72 adjusts CCPP 12 to use the variant control profile. Process P6 may involve operational control system 72 applying one or more modifications to an existing control profile for CCPP 12 to vary one or more parameters (e.g., temperatures such as firing temperature, inlet temperature, exhaust temperature, etc.) as defined in the variant control profile. In some cases, operational control system 72 may adjust and/or otherwise modify the varied parameters based on one or more properties of the specific CCPP 12 unit that is being controlled. In any case, the parameters (e.g., temperatures) being modified may be biased substantially in real time as CCPP 12 continues to operate. After CCPP 12 is adjusted in process P6, the method may conclude ("Done") and CCPP 12 may continue to operate using the variant control profile. In further examples, the method may return to process P3 of modeling the fuel consumption for CCPP 12 using power plant model 68, and repeating process P4 and decisions D1, D2 using a new variant control profile to iteratively improve upon CCPP 12 as it continues to operate. In some cases, embodiments of the method may be repeated after any significant change to the load condition and/or ambient condition of CCPP 12.

Adjusting CCPP 12 to use the variant control profile in process P6 may include one or more additional operations to provide the variant control profile, and/or further modify CCPP 12. According to one example, the adjusting may include increasing or reducing the fluid flow through attemperator(s) 74 to attain the desired temperature increase or reduction within CCCPP 12. In another example, the adjusting may include adjusting a pitch angle of IGV(s) 36, thereby changing the inlet temperature within GT system 30 and/or the temperatures of other fluidly connected components. In yet another example, the adjusting may include adjusting an amount of compressor exhaust fluid routed through IBH line 76, thereby also modifying both the inlet and outlet temperature(s) of compressor 32. In still another example, the modifying may include adjusting a steam output from HRSG 54 to further modify one or more temperatures within ST system 18 and/or GT system 30.

Figure 5:
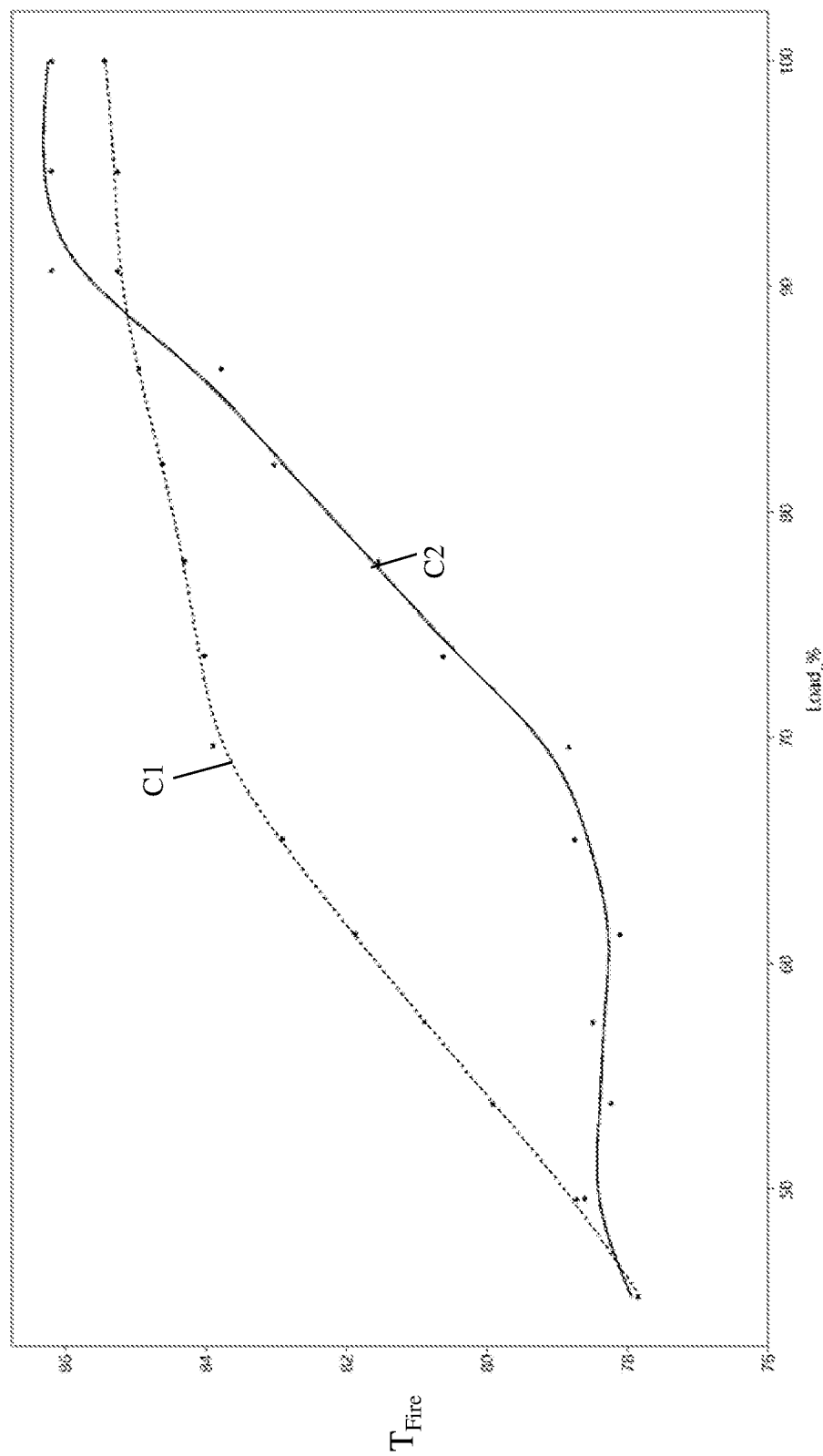
FIG. 5 provides an illustrative plot of gas turbine inlet (alternatively, "firing") temperature versus load in a CCPP according to embodiments of the present disclosure.

Referring to FIGS. 3-5, embodiments of the disclosure may be operable to modify a temperature-load curve of CCPP 12 during operation, and thus may provide greater operational control of CCPP 12 than conventional control systems. As discussed herein, the temperature-load profile of CCPP 12 (indicated by curve C1) may be approximately linear in cases where the inlet (alternatively, "firing") follows only a single control profile. The conventional temperature-load profile C1 may increase approximately linearly, and/or at a decreasing rate, from its initial value to its maximum value when operating according to its initial control profile. However, applying variant control profiles to CCPP 12 according to methods according to the disclosure may significantly alter the rate at which the inlet temperature changes with respect to the load of CCPP 12. In an example, a modified temperature profile C2 may provide a reduced firing temperature, which in turn will result in reduced exhaust temperature within a corresponding range of power outputs (e.g., up to approximately 87% of maximum load), but may provide an increased firing, and thus, exhaust temperature at higher power outputs (e.g., above approximately 87% of maximum load). It is therefore emphasized that the variant control profile discussed in embodiments of the disclosure may not simply reflect a temperature increase or decrease within various portions of CCPP 12, but may include both higher and lower temperatures within particular components, depending on the amount of load output.

Figure 6:
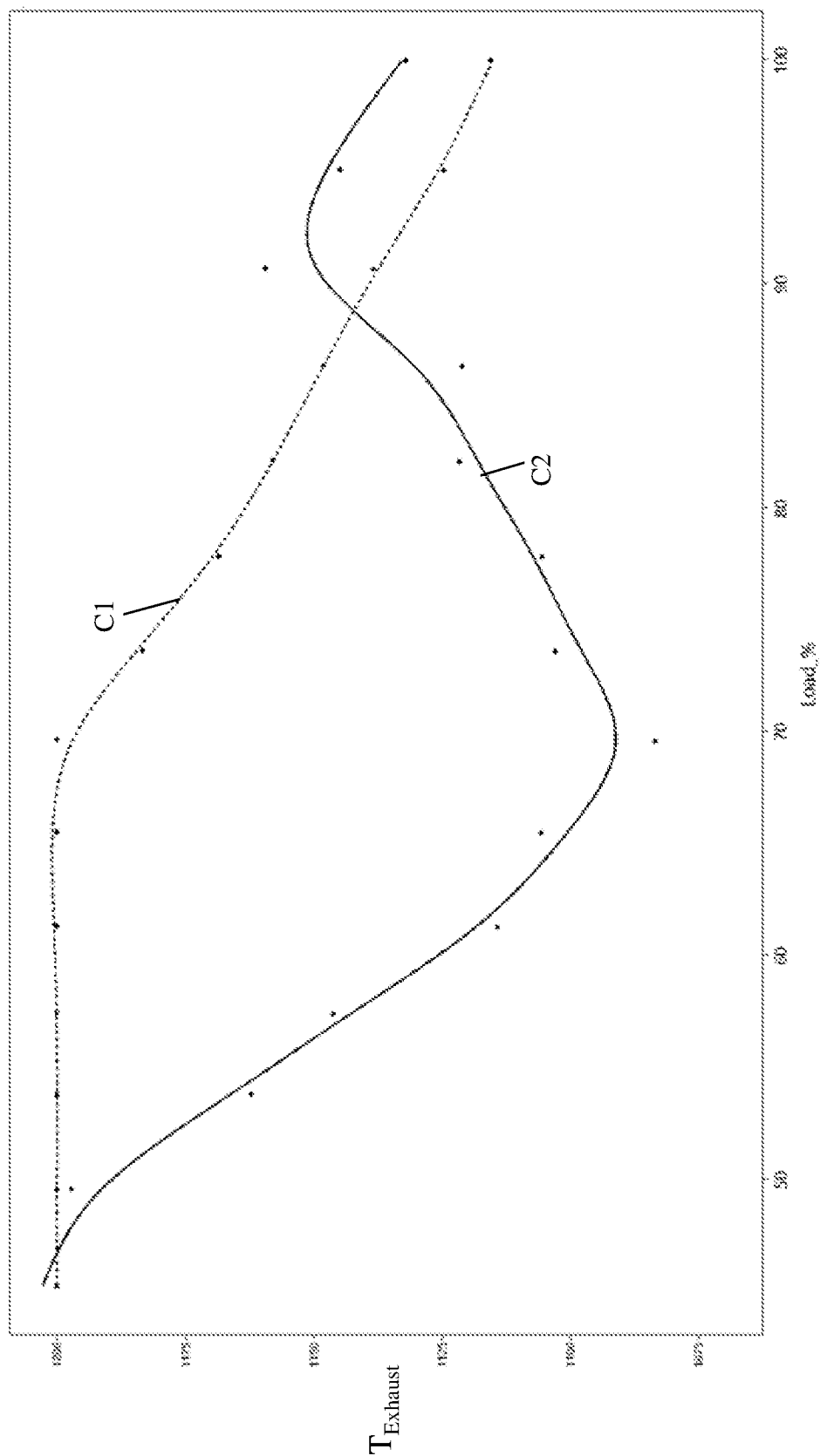
FIG. 6 provides an illustrative plot of gas turbine outlet (alternatively, "exhaust") temperature versus load in a CCPP according to embodiments of the present disclosure.
Figure 7:
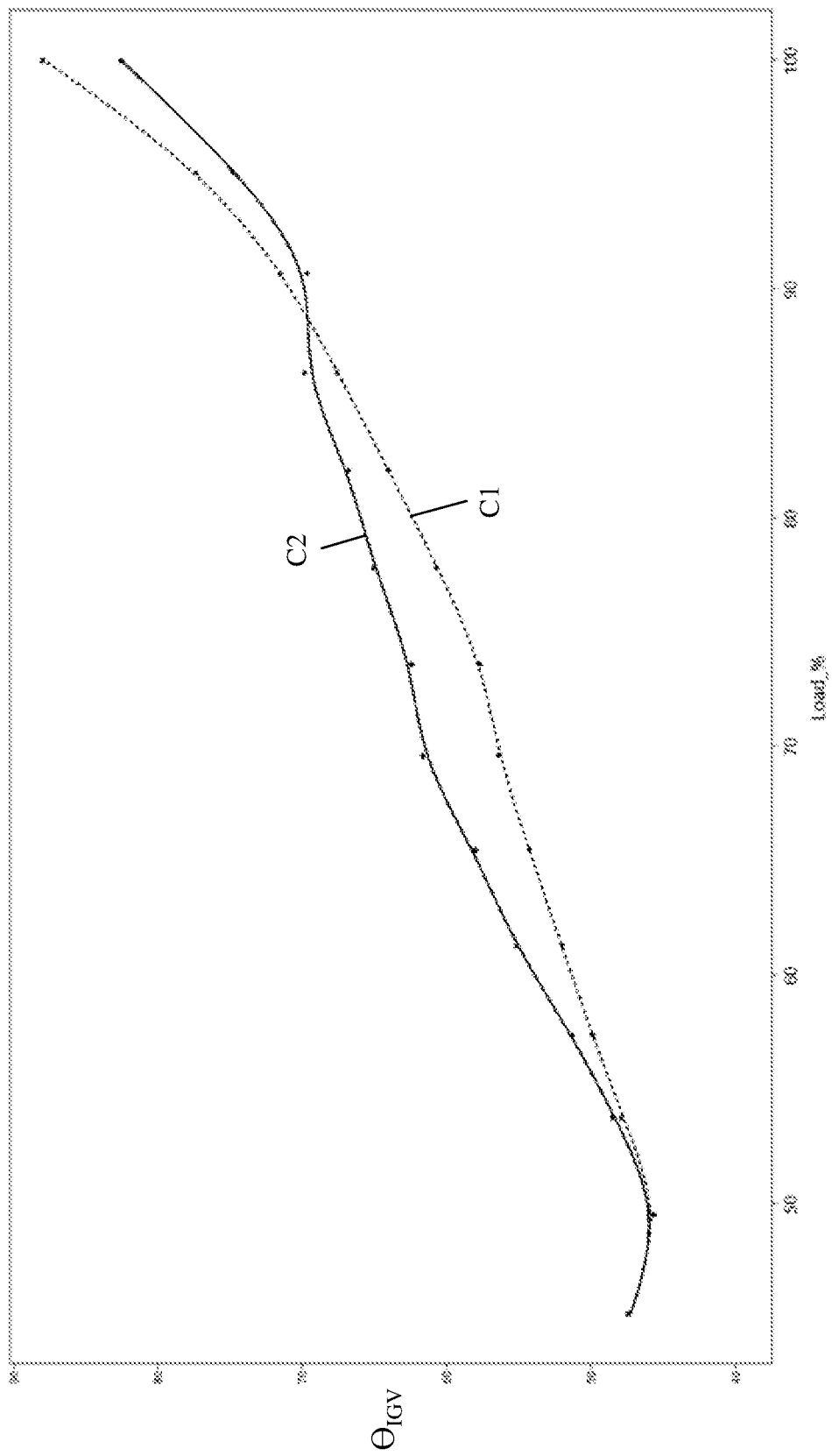
FIG. 7 provides an illustrative plot of inlet guide vane angle ($\theta_{IGV}$) versus load in a CCPP according to embodiments of the present disclosure.
Figure 8:
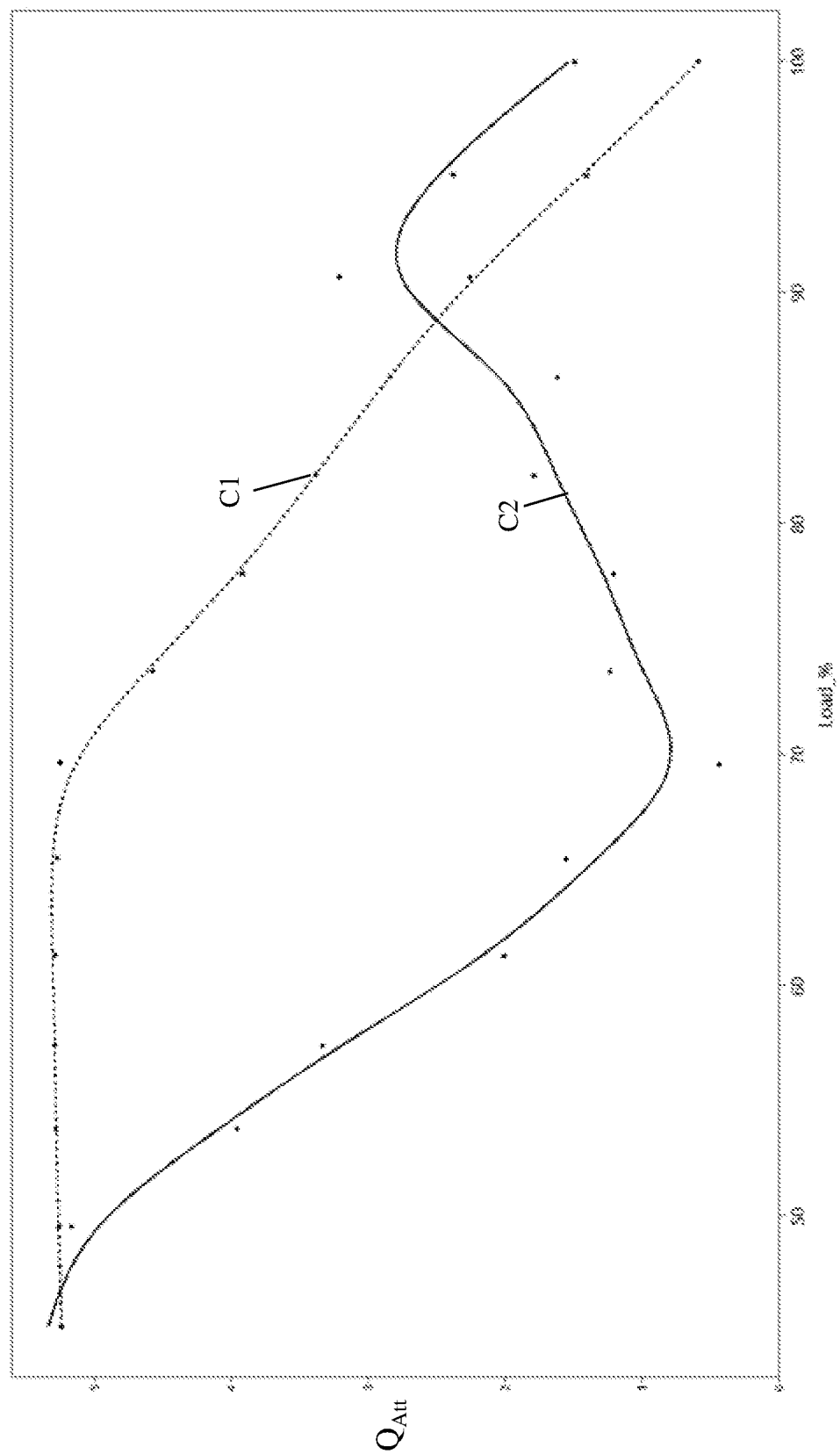
FIG. 8 provides an illustrative plot of attemperator fluid flow ($Q_{Att}$) versus load in a CCPP according to embodiments of the present disclosure.

Referring to FIGS. 3, 4, and 6, adjusting CCPP 12 to use a variant control profile may also affect the outlet temperature ($T_{exhaust}$, measured in degrees Fahrenheit (° F.)) of GT system 30. Embodiments of the disclosure thus may also modify the temperature-load curve of CCPP 12 at the outlet of GT system 30 during operation, and thus may affect several dependent attributes of CCPP 12 through the use of a variant control profile. The temperature-power profile of CCPP 12 (indicated by curve C1) may follow a piecewise-defined curve in which exhaust temperature remains constant at lower loads, and decreases linearly at higher loads. By contrast, the modified temperature-power profile of CCPP 12 (indicated by curve C2) may decrease more rapidly at lower loads and increase linearly at higher loads, e.g., to provide greater responsiveness and/or sensitivity to underlying changes in operation.

Referring now to FIGS. 3, 4, 7, and 8 adjusting CCPP 12 to use a variant control profile may also affect technical attributes of CCPP 12 other than temperature. For example, modifying CCPP 12 to use a variant control profile may also affect the IGV angle ("$\theta_{IGV}$" in FIG. 7) and/or the attemperator fluid flow ("$Q_{Att}$" in FIG. 8) during operation of CCPP 12. In the case of IGV angle, the variant control profile may change IGV position to an incident angle that is greater than a conventional incident angles at lower loads, and/or may change the IGV to position to an incident angle that is less than conventional incident angles at higher loads. In the case of attemperator fluid flow, operating CCPP 12 with the variant control profile may be substantially reduced at lower loads, while slightly increased at higher loads as a result of the above-noted changes in firing temperature and/or exhaust temperature.

Figure 9:
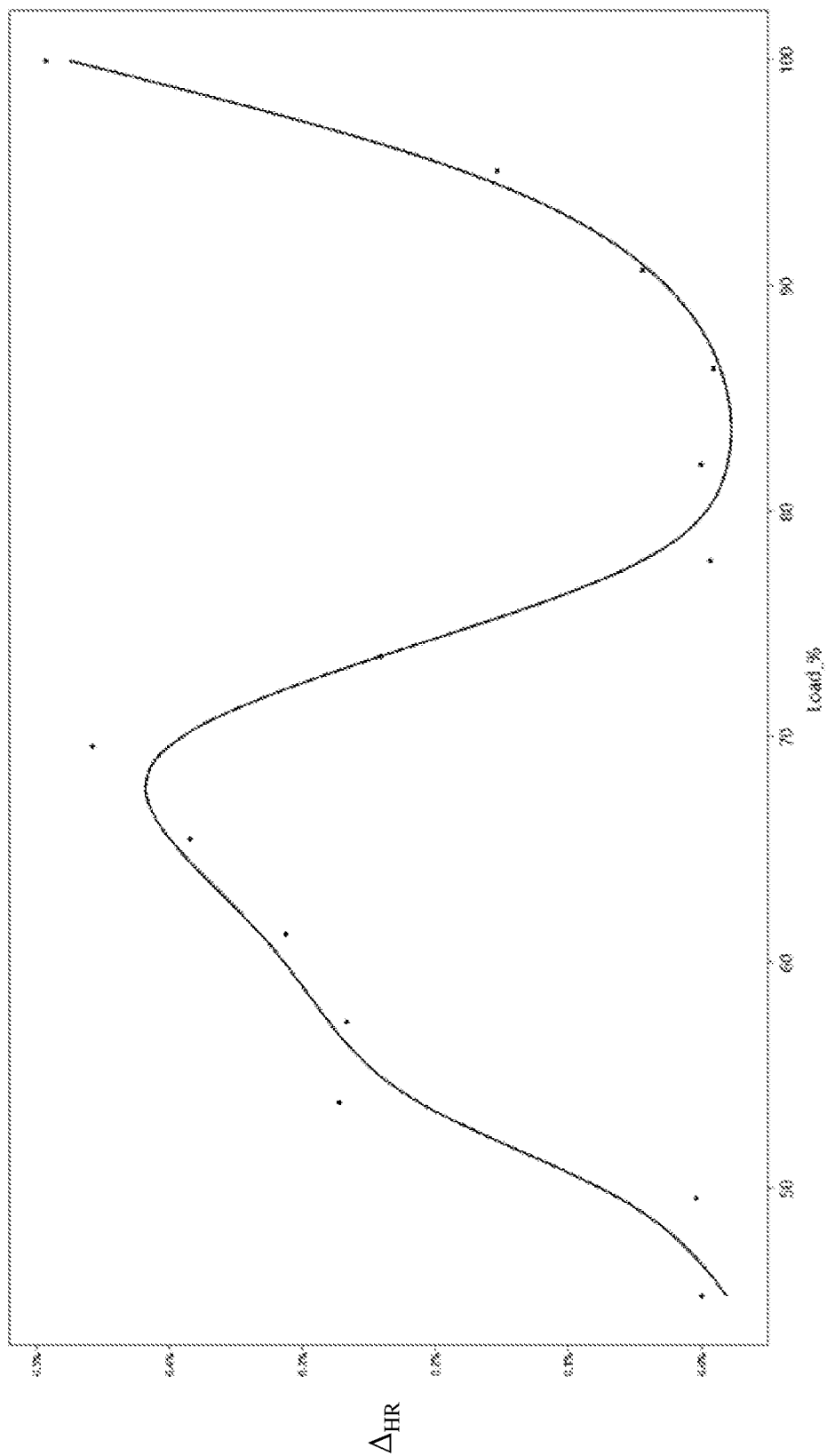
FIG. 9 provides an illustrative plot of heat rate change ($\Delta_{HR}$) versus load for a variant control profile in a CCPP according to embodiments of the present disclosure.

Referring briefly to FIGS. 3, 4, and 9, embodiments of the disclosure can also significantly affect other related properties of CCPP 12. Specifically, FIG. 9 illustrates the improvement in heat rate ($\Delta_{HR}$) for operating CCPP 12 at the variant control profile, as compared to the initial control profile for CCPP 12. As shown, the percent improvement to heat rate $\Delta_{HR}$ can be as large as approximately 0.5% at loads of, e.g., approximately 68% or 99% of the maximum CCPP 12 load.

Advantages of the disclosure allow for agile deployment and use of CCPP 12 in a power grid with a variety of energy sources, and/or in non-base load operating settings. In embodiments of the disclosure, CCPP 12 can easily fill gaps in demand and/or maintain efficient performance despite quickly changing between different amounts of power output. Embodiments of the disclosure thus allow CCPP 12 to compensate internally for fluctuations in energy demand, unavailability of other power sources, etc. The improvements to CCPP 12 may deliver reduce fuel consumption during operation, extended lifespan of individual systems and their components. Operating CCPP 12 in a mode where various section temperatures can be reduced may provide significant lifespan extension, and lower maintenance requirements. Additionally, embodiments of the disclosure may be implemented without significant changes to CCPP 12 hardware by modifying existing control logic, circuits, etc., to accommodate the operational methodologies described herein.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for operating a combined cycle power plant (CCPP), the method comprising:
　operating the CCPP at an ambient condition and a load condition;
　generating a power plant model of the CCPP for operating at the ambient condition and the load condition;
　modeling a fuel consumption using a baseline control profile and the power plant model of the CCPP at the ambient condition and the load condition;
　creating a variant control profile for the CCPP;
　determining, using the power plant model, whether the variant control profile meets a quality threshold for the CCPP, the quality threshold including at least a fuel efficiency of the CCPP;
　modifying the variant control profile in response to the variant control profile not meeting the quality threshold; and
　adjusting the CCPP to use the variant control profile in response to the variant control profile meeting the quality threshold, wherein the variant control profile adjusts a turbine section inlet temperature schedule or an exhaust temperature schedule for the CCPP,
　wherein adjusting the CCPP to use the variant control profile reduces an attemperator fluid flow within the CCPP during operation below a load output threshold for the CCPP and increases the attemperator fluid flow during operation above the load output threshold for the CCPP.

2. The method of claim 1, wherein the load output threshold for the CCPP is approximately 87% of a maximum load output of the CCPP.

3. The method of claim 1, wherein adjusting the CCPP to use the variant control profile includes adjusting an inlet guide vane (IGV) pitch angle within the CCPP.

4. The method of claim 1, wherein adjusting the CCPP to use the variant control profile reduces an inlet bleed heat (IBH) flow of exhaust fluid from an exhaust section to an inlet section of a compressor of the CCPP.

5. The method of claim 1, wherein adjusting the CCPP to use the variant control profile increases a steam output from a heat recovery steam generator (HRSG) assembly within the CCPP.

6. The method of claim 1, wherein the quality threshold further includes at least a minimum heat rate reduction, a minimum plant efficiency increase, a minimum reduction to fuel consumption, a fuel consumption limit, an emissions limit, or an operating stability limit for the CCPP.

7. The method of claim 1, further comprising:
modifying one of the load condition or the ambient condition of the CCPP; and
repeating the calculating, the creating, the determining, and one of the modifying of the variant control profile or the adjusting of the CCPP.

8. The method of claim 1, wherein creating the variant control profile includes applying a predetermined temperature increase or temperature reduction to the baseline control profile, based on the ambient condition and the load condition.

9. The method of claim 1, wherein the adjusted inlet temperature schedule and the adjusted exhaust temperature schedule of the CCPP are dependent on the load condition.

10. A program product stored on a computer readable storage medium for operating a combined cycle power plant (CCPP), the computer readable storage medium comprising program code for causing a computer system to perform actions including:
operating the CCPP at an ambient condition and a load condition;
generating a power plant model of the CCPP for operating at the ambient condition and the load condition;
modeling a fuel consumption using a baseline control profile and the power plant model of the CCPP at the ambient condition and the load condition;
creating a variant control profile for the CCPP;
determining, using the power plant model, whether the variant control profile meets a quality threshold for the CCPP, the quality threshold including at least a fuel efficiency of the CCPP;
modifying the variant control profile in response to the variant control profile not meeting the quality threshold; and
adjusting the CCPP to use the variant control profile in response to the variant control profile meeting the quality threshold, wherein the variant control profile adjusts a turbine section inlet temperature schedule or an exhaust temperature schedule for the CCPP,
wherein adjusting the CCPP to use the variant control profile reduces an attemperator fluid flow within the CCPP during operation below a load output threshold for the CCPP and increases the attemperator fluid flow during operation above the load output threshold for the CCPP.

11. The program product of claim 10, wherein the load output threshold for the CCPP is approximately 87% of a maximum load output of the CCPP.

12. The program product of claim 10, wherein adjusting the CCPP to use the variant control profile includes adjusting an inlet guide vane (IGV) pitch angle within the CCPP.

13. The program product of claim 10, wherein adjusting the CCPP to use the variant control profile reduces an inlet bleed heat (IBH) flow of exhaust fluid from an exhaust section to an inlet section of a compressor of the CCPP.

14. The program product of claim 10, wherein adjusting the CCPP to use the variant control profile increases a steam output from a heat recovery steam generator (HRSG) assembly within the CCPP.

15. The program product of claim 10, wherein the quality threshold includes at least a minimum heat rate reduction, a minimum plant efficiency increase, a minimum reduction to fuel consumption, a fuel consumption limit, an emissions limit, or an operating stability limit for the CCPP.

16. A system comprising:
a combined cycle power plant (CCPP) having a gas turbine and a heat recovery steam generator (HRSG); and
a system controller in communication with the gas turbine and the HRSG of the CCPP, the system controller being operable to:
operate the CCPP at an ambient condition and a load condition;
generate a power plant model of the CCPP for operating at the ambient condition and the load condition;
model a fuel consumption using a baseline control profile and the power plant model of the CCPP at the ambient condition and the load condition;
create a variant control profile for the CCPP;
determine, using the power plant model, whether the variant control profile meets a quality threshold for the CCPP, the quality threshold including at least a fuel efficiency of the CCPP;
modify the variant control profile in response to the variant control profile not meeting the quality threshold; and
adjust the CCPP to use the variant control profile in response to the variant control profile meeting the quality threshold, wherein the variant control profile adjusts a turbine section inlet temperature schedule or an exhaust temperature schedule for the CCPP,
wherein adjusting the CCPP to use the variant control profile reduces an attemperator fluid flow within the CCPP during operation below a load output threshold for the CCPP and increases the attemperator fluid flow during operation above the load output threshold for the CCPP.

17. The system of claim 16, wherein the load output threshold for the CCPP is approximately 87% of a maximum load output of the CCPP.

18. The system of claim 16, wherein the system controller adjusting the CCPP to use the variant control profile adjusts an inlet guide vane (IGV) pitch angle within the CCPP.

19. The system of claim 16, wherein the system controller adjusting the CCPP to use the variant control profile increases a steam output from a heat recovery steam generator (HRSG) assembly within the CCPP.

20. The system of claim 16, wherein the quality threshold includes at least a minimum heat rate reduction, a minimum plant efficiency increase, a minimum reduction to fuel consumption, a fuel consumption limit, an emissions limit, or an operating stability limit for the CCPP.

* * * * *